Jan. 5, 1971 P. STERN 3,552,037
PRE-PROGRAMMED PLANETARIUMS
Filed May 19, 1966 10 Sheets-Sheet 1

INVENTOR
Philip Stern
BY
Mattern, Ware & Davis
ATTORNEYS.

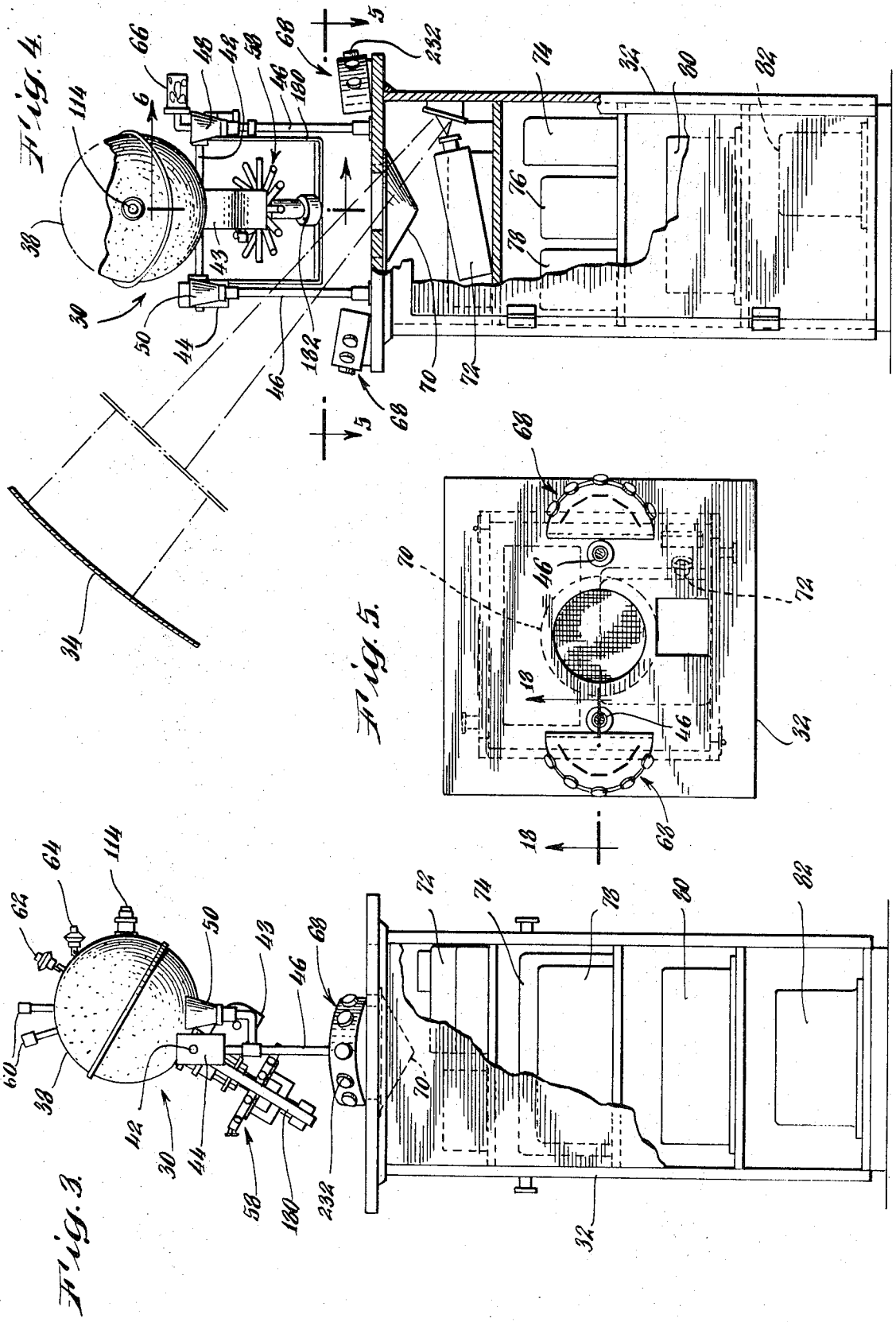

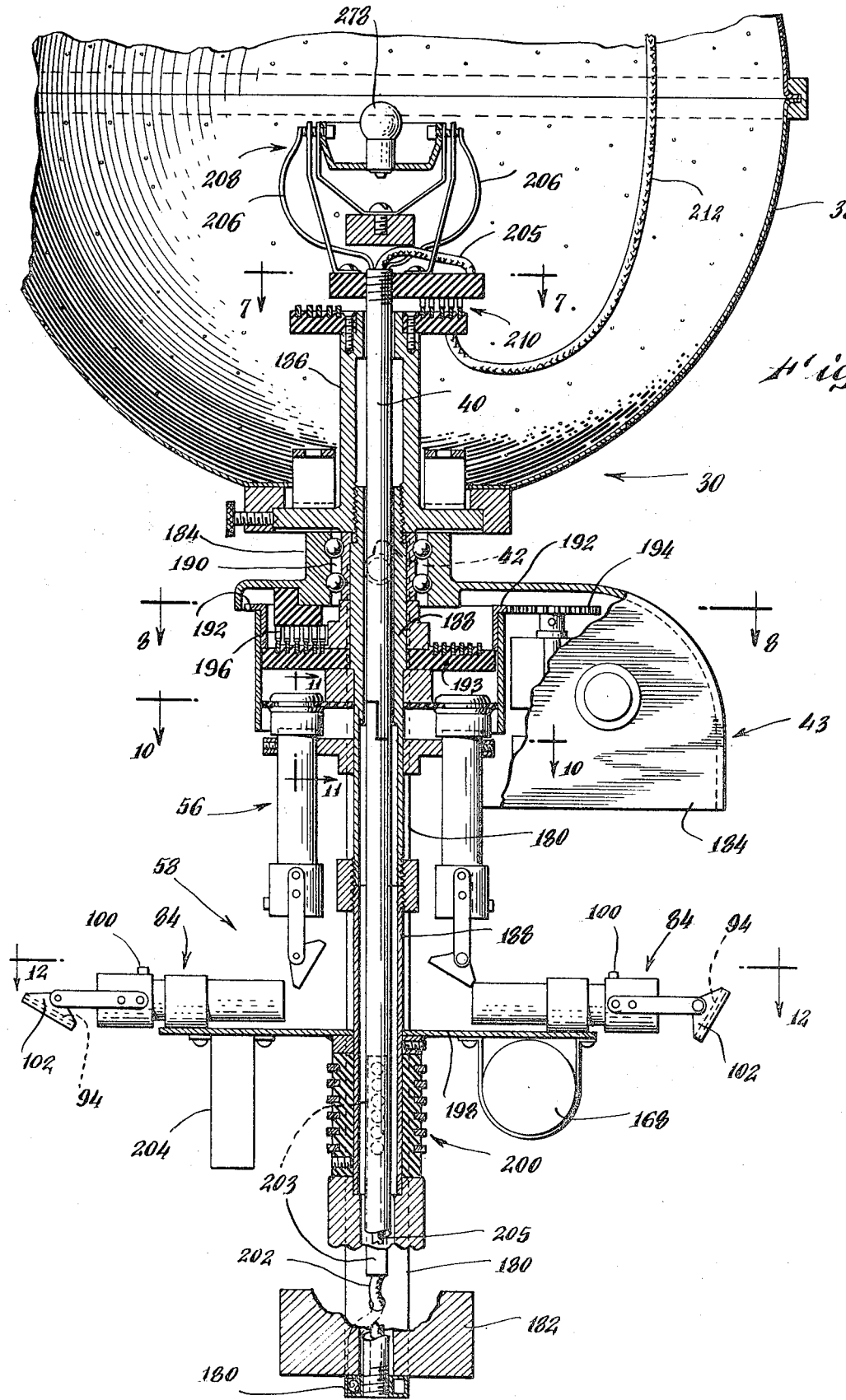

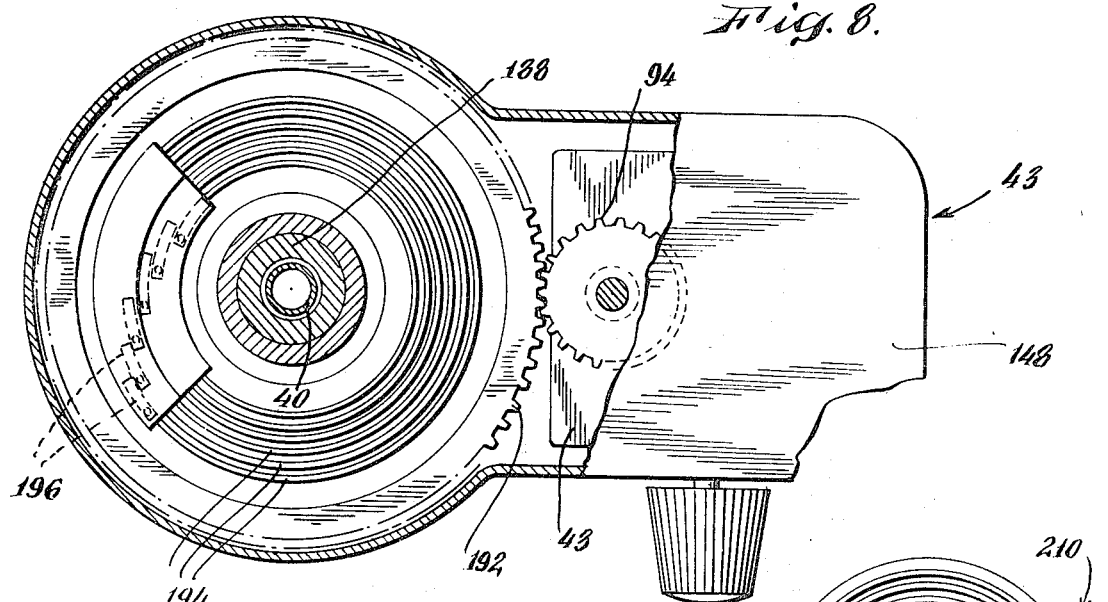
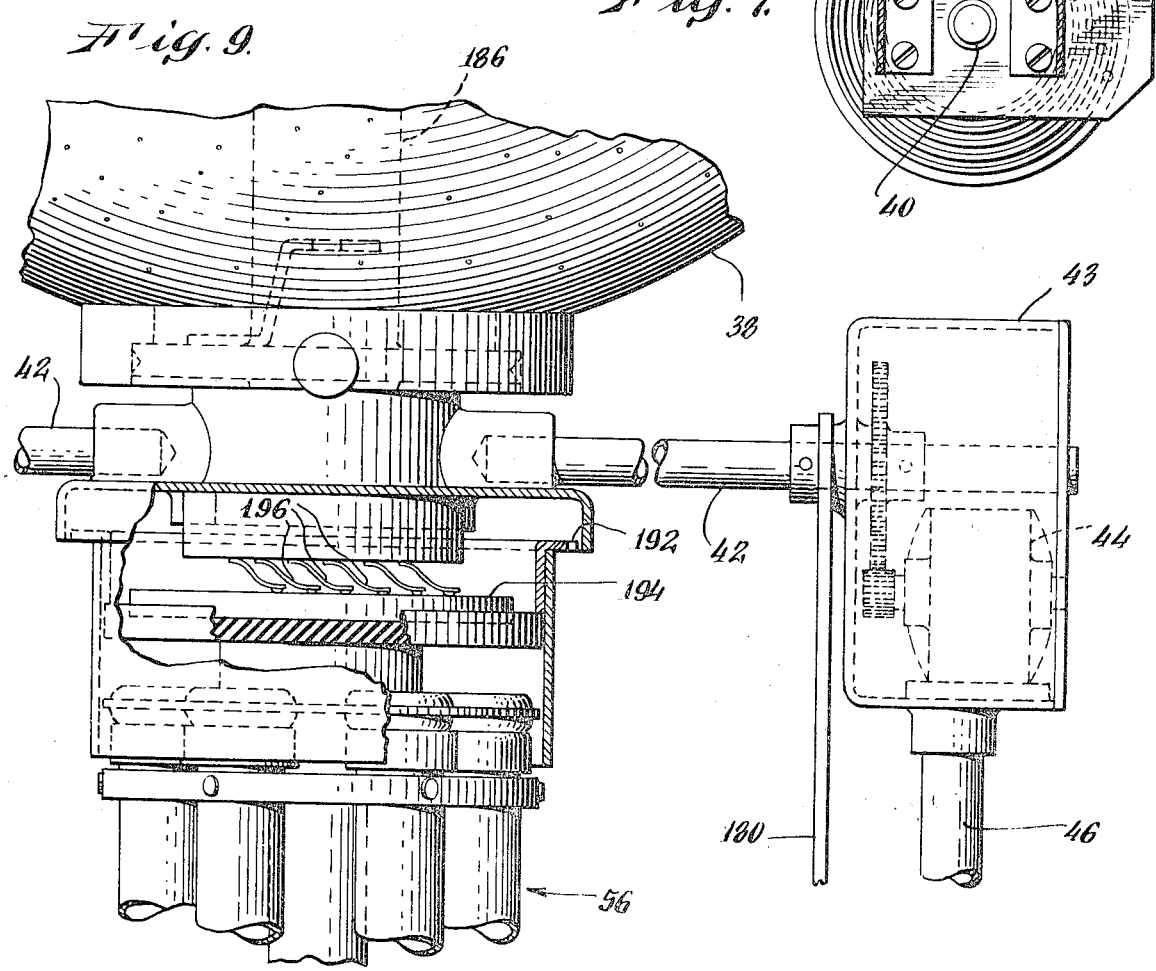

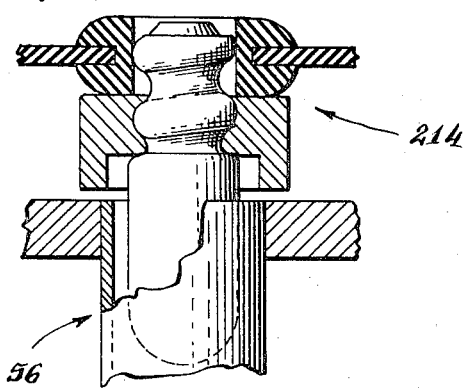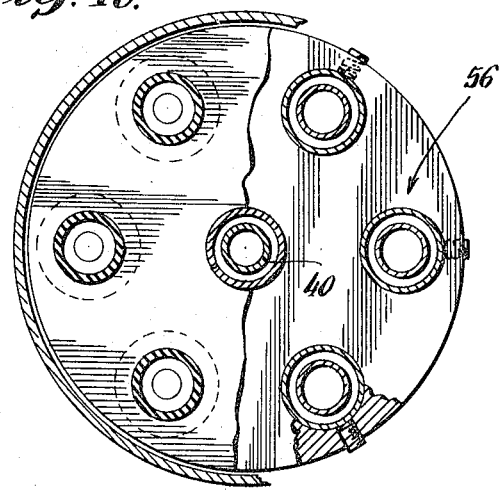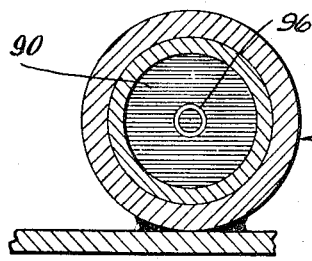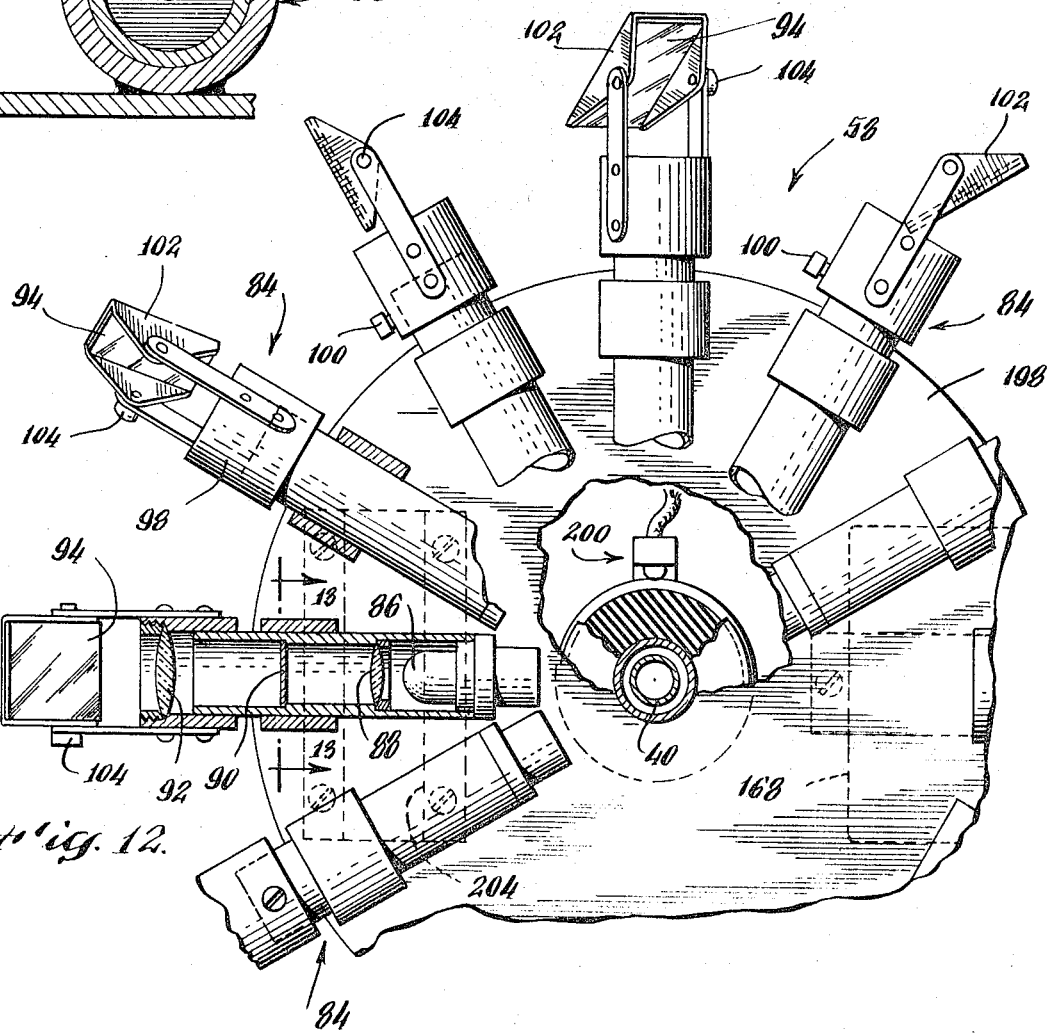

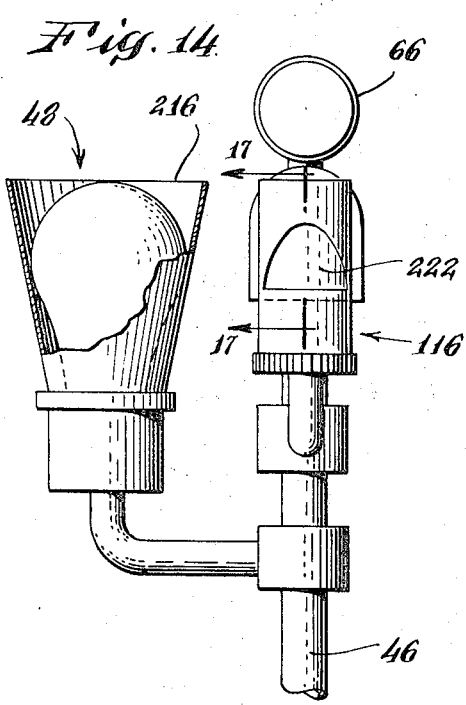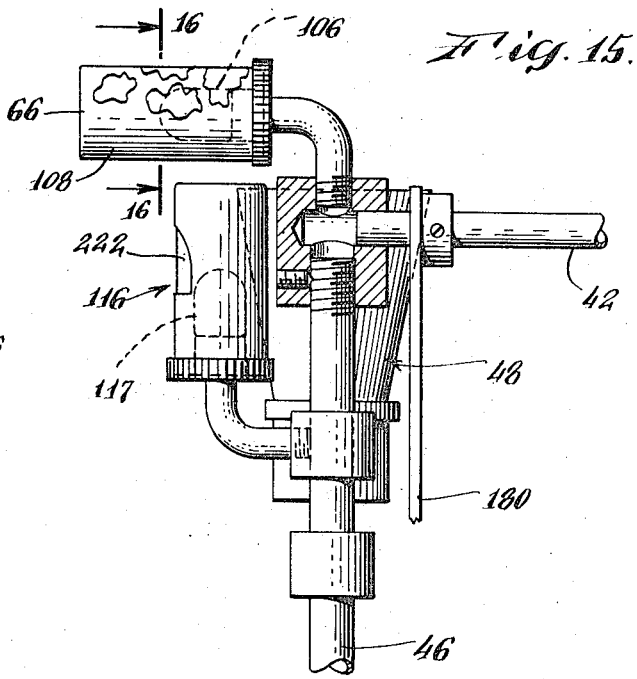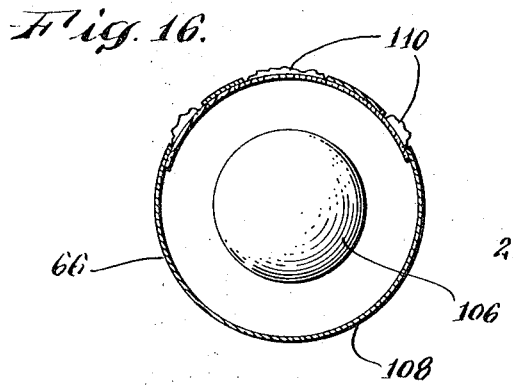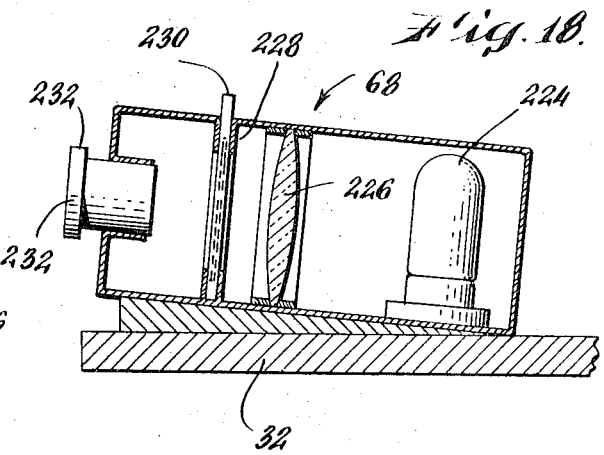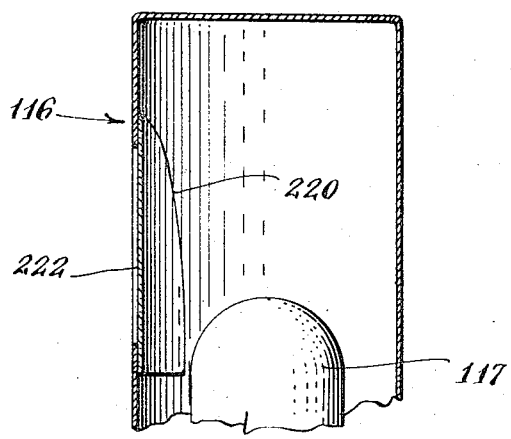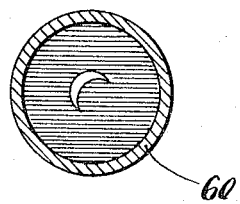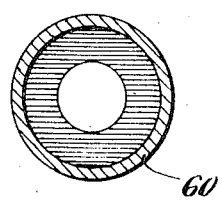

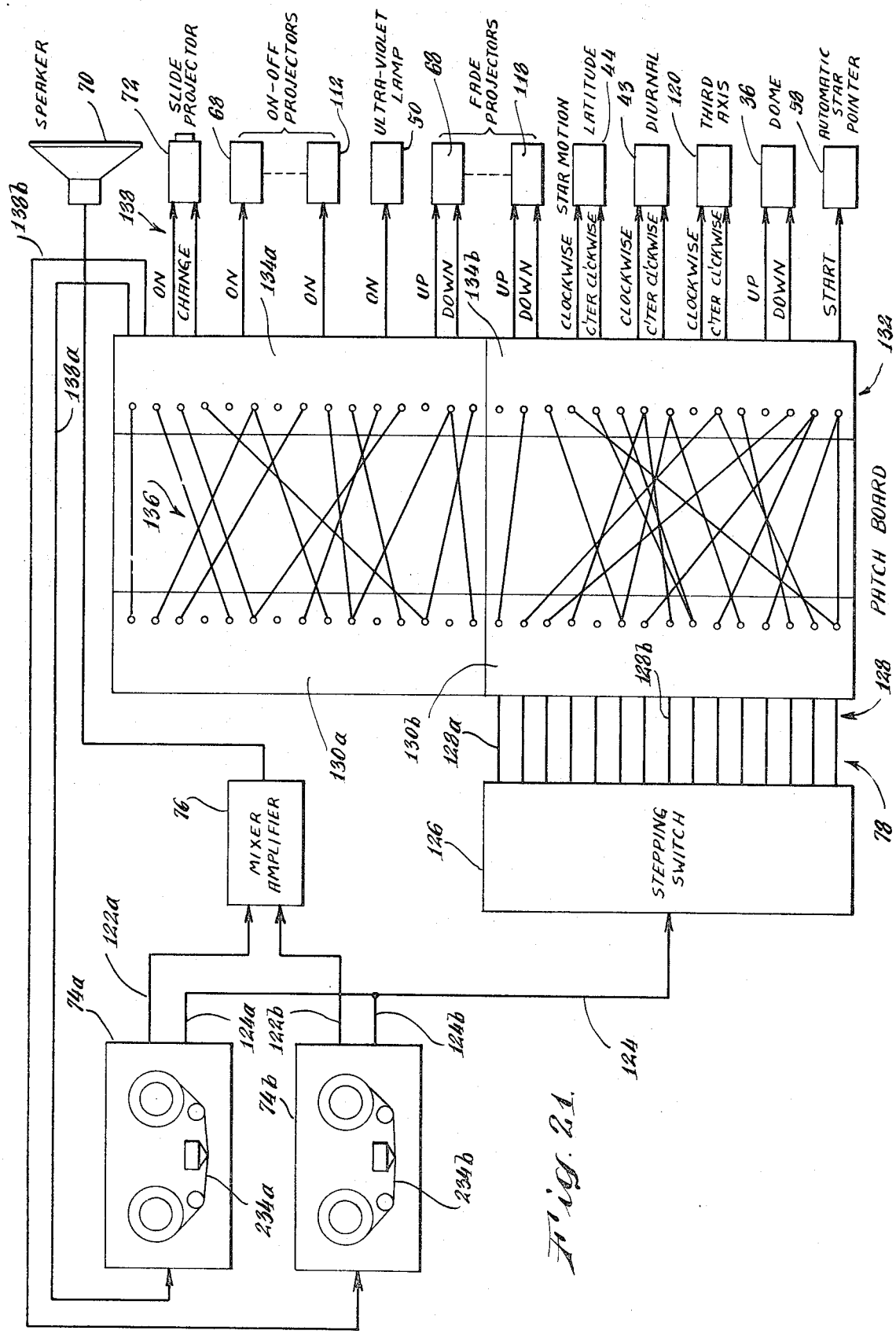

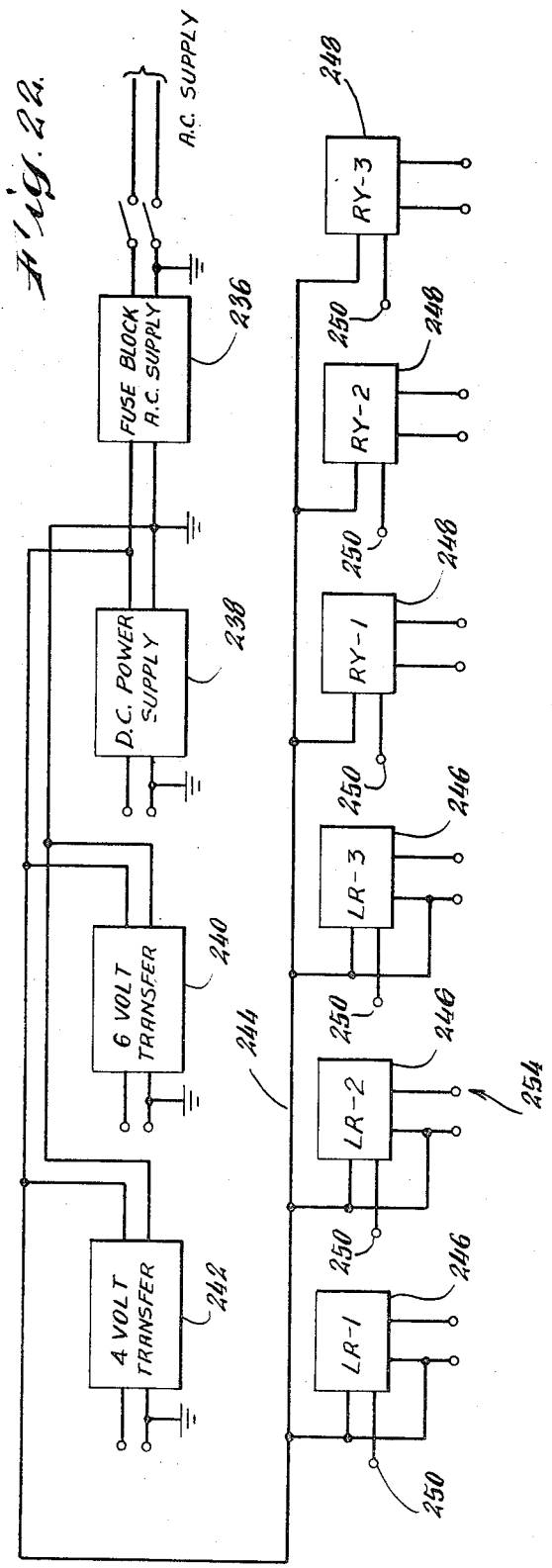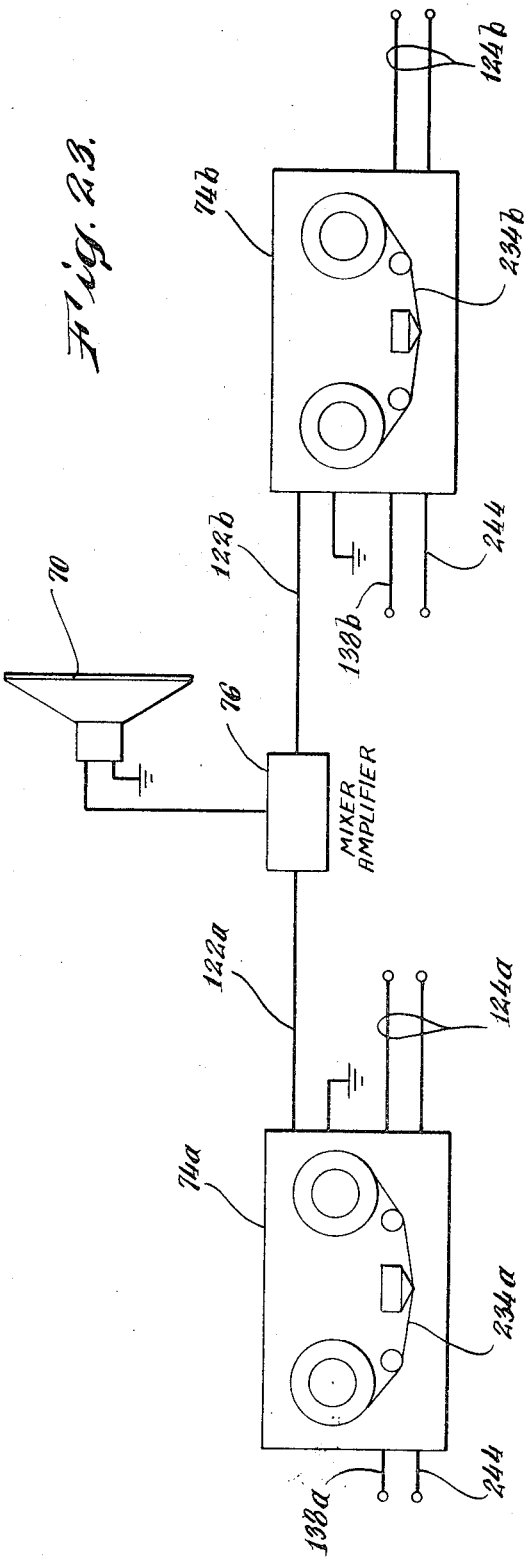

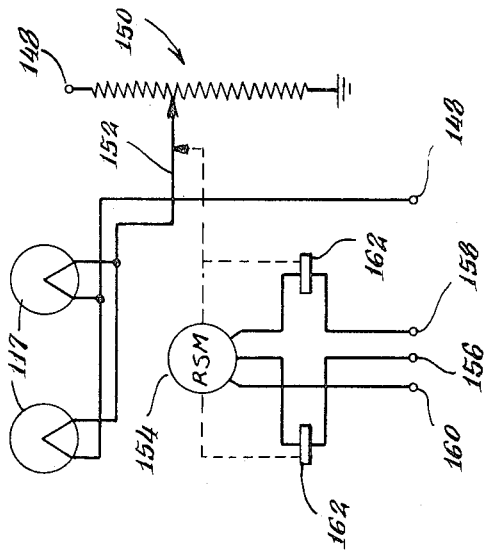

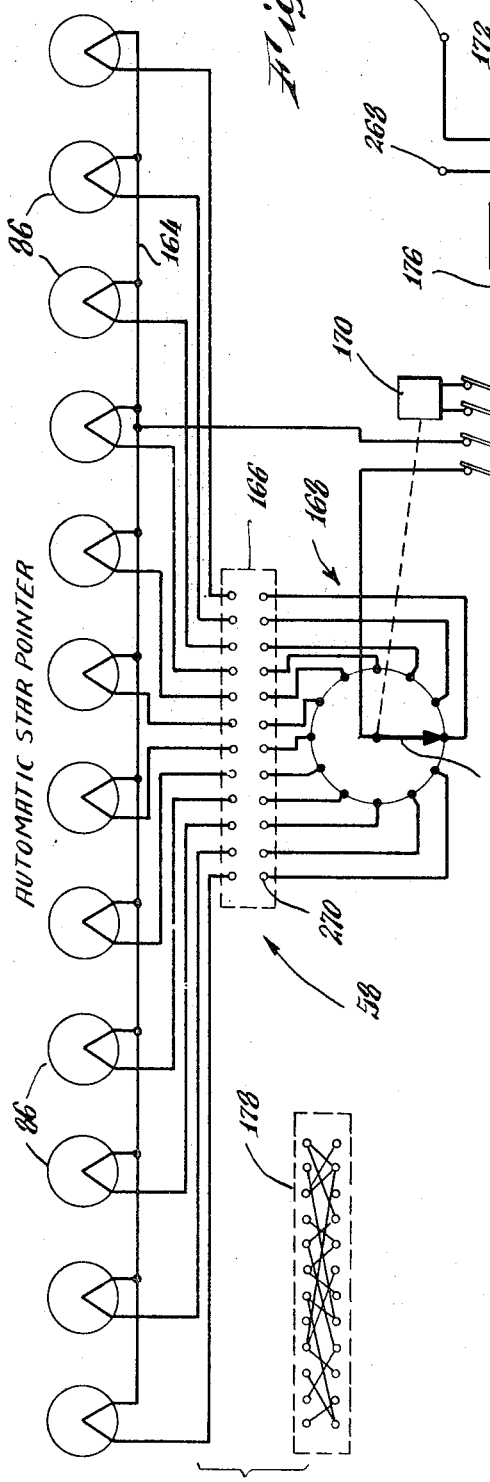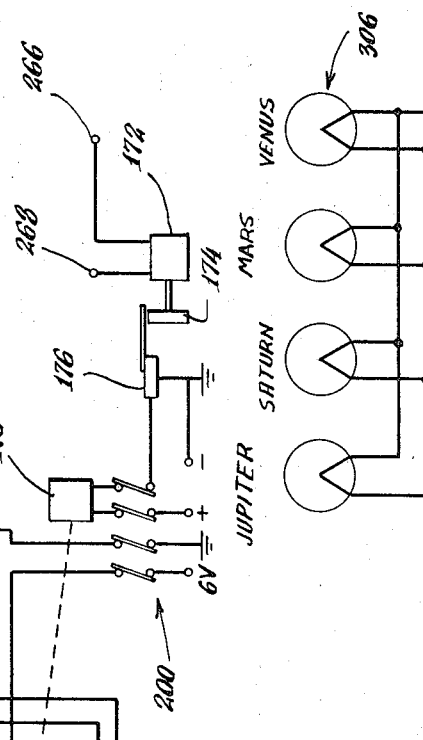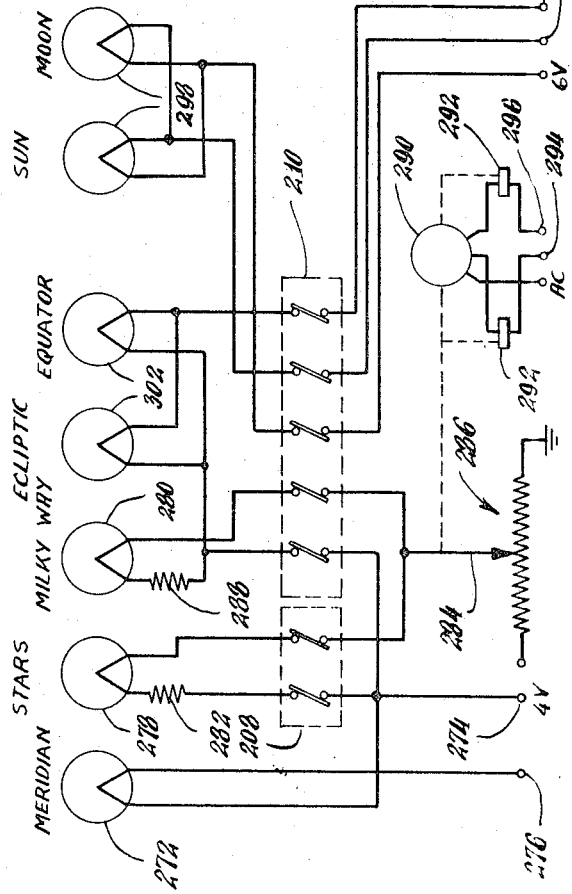

3,552,037
PRE-PROGRAMMED PLANETARIUMS
Philip Stern, Fairfield, Conn., assignor to Planetariums
Unlimited, Inc., Holbrook, N.Y.
Filed May 19, 1966, Ser. No. 551,366
Int. Cl. G09b 27/06
U.S. Cl. 35—42.5                           10 Claims

ABSTRACT OF THE DISCLOSURE

A pre-programmed planetarium controlled by a synchronized timing track on a tape recorder. Planetarium lectures for the planetarium and time signals synchronized with the lectures are recorded on magnetic tape. The signals actuate a stepping switch and produce sequential energization of various functions of the planetarium. A plurality of individual start pointers are fixedly mounted to the star projector of the planetarium. Each has an individually adjustable means for focusing a target image at or near a star to be located. The star pointers are connected to a stepping switch which is actuated at preselected intervals by time signals from the tape recorder.

---

Planetarium lectures for the planetariums of the invention are recorded on magnetic tape. Synchronized time signals are also recorded on the tape. They actuate a stepping switch and produce sequential energization of a plurality of electrical circuits. A multiplicity of planetarium function generators are connectable to the electrical circuits by means of a patch board which may be manually set up or automatically set up by means of a pre-programmed switch or pre-wired patch board.

The function generators may include a loud speaker for broadcasting the lecture, music and sound effects; an automatic slide projector for projecting explanatory slides; various auxiliary on-off projectors; various auxiliary fade projectors for projecting increasing and decreasing lighting effects (e.g. sunset and dawn); star motion motors for rotating the star projector; and a dome control mechanism for bringing the sky dome from a stored position to a position for a planetarium lecture.

The invention further provides a novel automatic star pointer system. In the preferred embodiment of the invention a plurality of individual star pointers are fixably mounted to the star projector. Each of these has an individually adjustable means for focusing a target image at or near a star to be located. This adjustment is made prior to the planetarium lecture. Each individual star pointer may be actuated by the timed signals from the tape recorder. However, in the preferred embodiment of the invention, the star pointers are connected to a stepping switch which may be actuated at preselected intervals by the time sginals from the tape recorder. The individual star pointers are preconnected to the stepping switch by means of a manual or pre-programmed patch board or pre-programmed switch.

A further novel feature of the invention is the printing or painting on the planetarium sky dome of hour circles and parallels of declination with fluorescent paint and the selective illumination thereof with ultraviolet light.

A novel combination provided by the invention is the pre-programmed lecture kit which comprises a tape recording of the lecture, including the timed programming signals; a plurality of slides for the automatic slide projector, and the special effects on-off and fade projectors; instructions for aligning the star pointers; instructions or pre-programmed means for setting up the main patch board between the stepping switch and the entire set of planetarium function generrtors; instructions or pre-programmed means for setting up the patch board between the star pointer stepping switch and star pointer illumination lamps; and, additional instructional materials related to the lecture.

The invention is further characterized in the preferred embodiment thereof by the use of two tape recordings, one for the presentation of a general educational lecture relating to the heavens and another for the presentation of a specific lecture; for example, one relating to an aspect of the heavens presented at a particular season of the year. Two lectures may be combined, as appropriate, into a unified planetarium program. In this case, the planetarium program kit may include two tape recordings; two sets of slides for the slide projectors; and two main patch board programming means.

BACKGROUND OF THE INVENTION

Modern planetariums, wherein star images are projected onto a sky dome, came into being approximately forty years ago. These machines, as exemplified by the Adler planetarium in Chicago and the Hayden planetarium in New York, are characterized by enormous complexity, great capital investment, large staffs of technicians and lecturers, and substantial operating costs. Typically, three or four individuals are required to operate the planetarium during a lecture; the lecturer himself and several technicians controlling auxiliary function generators for creating special effects. The lecturer must be highly trained as an astronomer, teacher, and popular lecturer, and must acquire a high degree of skill and coordination as during the lecture he must operate the main sequence of controls of the planetarium at the appropriate times and must use a hand-held star pointer for pointing to objects in the heavens then of interest. Some idea of the complexity of the task of conducting a planetarium lecture can be gained from the following quotation found at page 23 of the pamphlet "The Adler Planetarium and Astronomical Museum" by Phillip Fox published by the planetarium:

"The control board at first glance seems fairly complex but it is logically arranged and sufficient mastery to enable the demonstrator to operate it in the dark or with dim light is soon acquired. Considerable experience and practice are needed, however, before the demonstrator can without hestitation make the correct contacts. If, from inexperience, he must divert attention from the thought of his lecture to consider the operation of the switchboard, his discourse is interrupted or perhaps incoherent. A novice should not drive an automqbile in city traffic. Fortunately, in the planetarium no damage can result from turning the wrong switch except that to the speaker's complacency. It is a matter of chargrin to prepare an audience for the approaching trip to the pole and find instead the equinox moving among the stars with swiftly rolling centuries. An obvious solution is to have a trained operator and free the lecturer from the responsibility. But more freedom, more elasticity, more spontaneity are available if the demonstrator manipulates the controls."

"The seven motors under instant control by the several switches may be operated in as many different ways as there are possible combinations, having in mind that any or all of them may be arrested or reversed. Mathematically there are 2187 possible combinations, including the one when all circuits are dead. The vast majority of combinations serve no logical or illustrative purpose. For example, the use of all seven in any possible combination of direct or reverse would produce an almost meaningless phantasmagoria. The combinations actually used are comparatively few, less than two score. Certain interesting combinations to give perpetual noonday or eternal spring have been previously cited. Just as certain combinations are of interest so also certain sequences of motion are of value; for example, the change of latitude to bring the pole to the zenith to be followed by diurnal motion to show the movement of the stars on the parallel sphere.

"Ready to the hand of the demonstrator is an optical pointer. It is plugged into the switchboard. Its brightness may be controlled. It is a focusing lamp which throws an image of an arrow on the dome. As it is held in the hand any point of interest can be indicated. Care must be exercised to use it sparingly, to move it slowly, to hold it steadily on the object, to extinguish it when it has served its purpose. Rapid motion of this arrow or unsteady holding or excessive brightness is annoying."

The above quotation refers only to control of the motors for generating star and planetary motions. A good planetarium program in addition includes auxiliary teaching slides, special lighting, on-off projectors, fade projectors, music, and sound effects. It is little wonder then that many smaller planetariums that have been built at large public expense are relatively little used due to a dearth of trained lecturers and technicians.

On the other hand, educators have come to realize the great potential of the planetarium in conveying information of all types, particularly to children. The heavens with their mythological constellations, planets and distant galaxies whose light, as seen by us, may have originated at the beginning of time; the heavens to which man has long aspired and is just beginning to explore; are as it were, an exciting point of departure for teaching science, literature, and the arts, as well as astronomy. To this end, small, relatively inexpensive planetariums have been designed which will project star images, the sun and the moon, for classroom lecturers. Such planetariums are, for example, enormously popular in Japan where there is a program underway to supply every elementary school with one. However, the planetariums, although requiring only a small capital investment, require a large investment in training teachers in their use and in teachers' time in preparing each lecture. Thus, their operating costs are relatively high. Furthermore, they can never hope to achieve the professionalism and multiplicity of effects achieved by a large, well-equipped planetarium.

OBJECTS OF THE INVENTION

It is therefore, an object of the present invention to provide a pre-programmed planetarium.

Another object of the invention is to provide a pre-programmed planetarium that is relatively inexpensive.

A further object of the invention is to provide a pre-programmed planetarium of the above character that is easy to operate.

Still another object of the invention is to provide a pre-programmed planetarium of the above character providing a majority of the functions found in a large well-staffed planetarium.

Yet another object of the invention is to provide a pre-programmed planetarium of the above character wherein two or more lectures may be sequentially played to form a unified single lecture.

Still another object of the invention is to provide a pre-programmed planetarium of the above character characterized by ease of preparation of lectures therefor.

A further object of the invention is to provide a pre-programmed planetarium of the above character, particularly for use in schools.

Another object of the invention is to provide an automatic star pointer for a pre-programmed planetarium of the above character.

Still another object of the invention is to provide an automatic star pointer of the above character that is easily set up by inexperienced personnel.

A further object of the invention is to provide means for imaging hour circles, parallels of declination, and other coordinates on a planetarium sky dome.

A still further object of the invention is to provide program packages for controlling pre-programmed planetariums of the above character.

Among the particular objects of the invention are to provide pre-programmed planetariums of the above character controlled by two sound record means; having an automatic slide projector, on-off and fade projectors for special effects; providing star motion; ultraviolet illumination of fluorescent sky dome coordinates; and, automatic deployment of a sky dome from a retracted to an in-use position; and providing an automatic star pointer.

Other objects of the invention will in part be obvious and will in part appear hereinafter.

The invention accordingly comprises the features of construction, combinations of elements, and arrangements of parts, as exemplified in the constructions herein described; and the features of operations, combinations of functions, and sequences of operations and signals, as exemplified in the systems herein described. The scope of the invention is indicated in the claims.

DESCRIPTION OF THE INVENTION

For a fuller understanding of the nature and the objects of the invention, reference should be had to the following detailed description taken in connection with the accompanying drawings in which:

FIG. 3 is an enlarged side view similar to FIG. 2 of the pre-programmed planetarium of the present invention;

FIG. 4 is a front view of the pre-programmed planetarium of FIG. 3;

FIG. 5 is a cross-sectional view taken along the line 5—5 of FIG. 4;

FIG. 6 is a cross-sectional view, partially cut away, taken along the line 6—6 of FIG. 4;

FIG. 7 is a cross-sectional view taken along the line 7—7 of FIG. 6;

FIG. 8 is a cross-sectional view, partially cut away, taken along the line 8—8 of FIG. 6;

FIG. 9 is an enlarged fragmentary back view of the pre-programmed planetarium of FIG. 3;

FIG. 10 is a cross-sectional view, partially cut away, taken along line 10—10 of FIG. 6;

FIG. 11 is a fragmentary cross-sectional view taken along line 11—11 of FIG. 6;

FIG. 12 is an enlarged fragmentary cross-sectional view taken along line 12—12 of FIG. 6;

FIG. 13 is a fragmentary cross-sectional view taken along line 13—13 of FIG. 12;

FIG. 14 is an enlarged fragmentary side view partially cut away taken from the right side of FIG. 4;

FIG. 15 is a side view of the elements shown in FIG. 14;

FIG. 16 is a cross-sectional view taken along the line 16—16 of FIG. 15;

FIG. 17 is an enlarged cross-sectional view, partially cut away, taken along the line 17—17 of FIG. 14;

FIG. 18 is an enlarged cross-sectional view, taken along the line 18—18 of FIG. 5;

FIGS. 19 and 20 are transparencies of the sum and the moon as used in the pre-programmed planetariums of the invention;

FIG. 21 is a system block diagram of a preferred pre-programmed planetarium according to the present invention;

FIG. 22 is an electrical circuit block diagram of a power supply for the pre-programmed planetarium system of FIG. 21;

FIG. 23 is a detailed circuit block diagram of the two tape decks and sound system of the pre-programmed planetarium of the invention;

FIG. 24 is a detailed perspective view of a preferred form of pre-programmable patch board for the system shown in FIG. 21;

FIG. 25 is a detailed circuit block diagram of the automatic slide projector of FIG. 23;

FIG. 26 is a detailed circuit block diagram of a particular fade projector of the system of FIG. 21;

FIG. 27 is a detailed circuit block diagram of a particular axis or star motion drive of the system of FIG. 21;

FIG. 28 is an electrical block diagram of the automatic star pointer shown in FIG. 21;

FIG. 29 is an electrical circuit block diagram of a plurality of on-off and a fade projector of FIG. 21; and, FIG. 30 is an electrical circuit diagram of the planet on-off projectors of FIG. 21.

GENERAL DESCRIPTION

Figure 1:
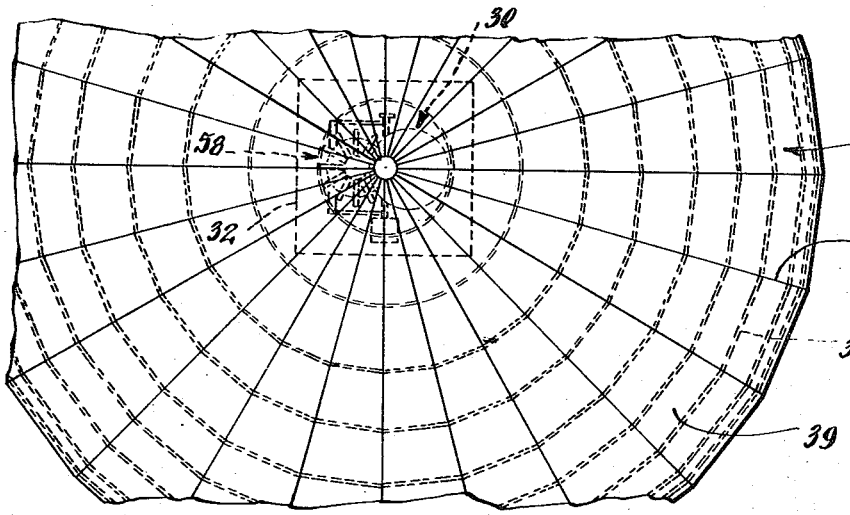
FIG. 1 is a plan view, partially cut away, of a planetarium installation according to the present invention.
Figure 2:
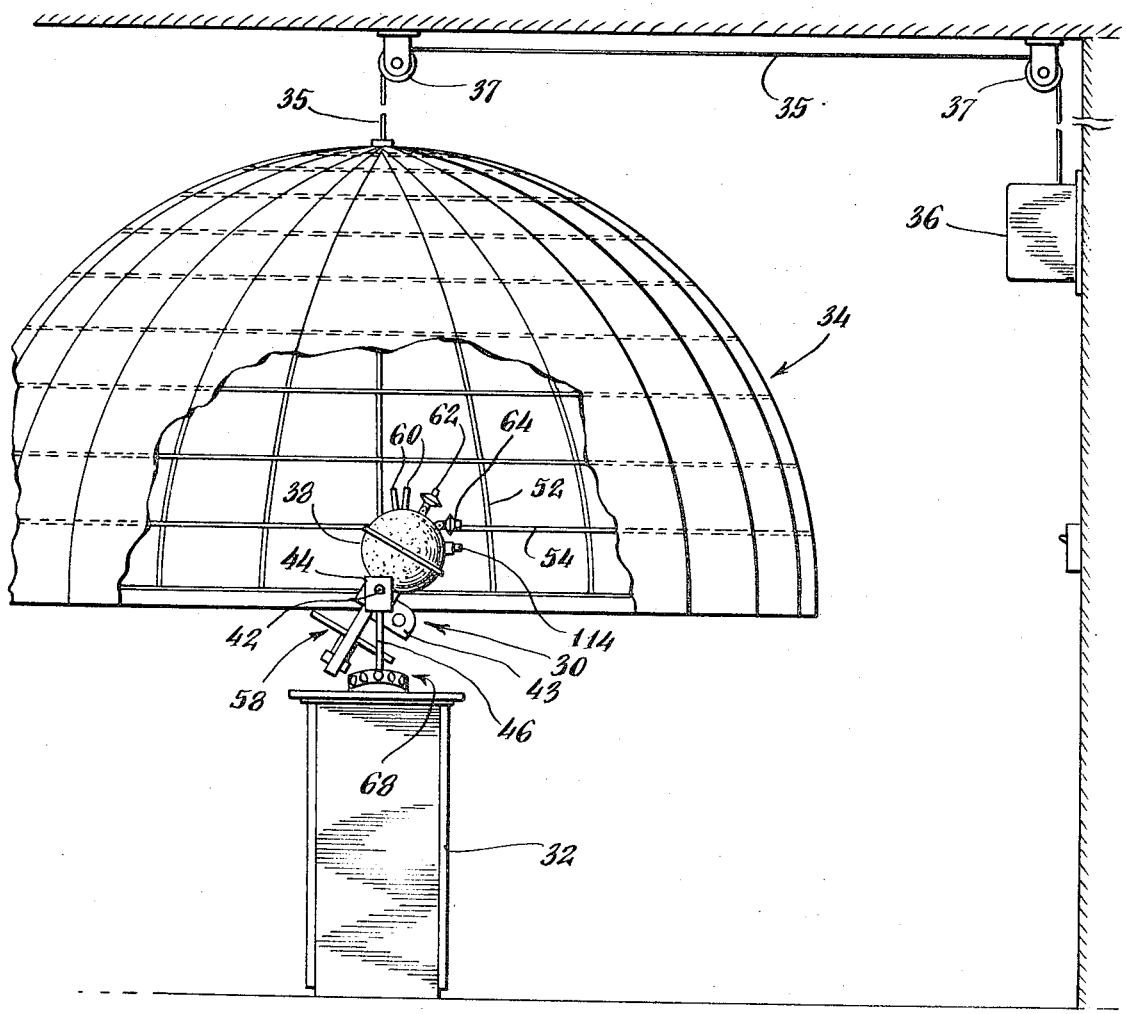
FIG. 2 is a side elevation, partially cut away, of the planetarium installation of FIG. 1.

A planetarium installation according to the present invention is shown in FIGS. 1 and 2. It comprises the planetarium projector, generally indicated at 30, mounted on an equipment cabinet 32. The projector 30 projects star images upon the sky dome 34 which may be raised or lowered by the motor 36.

Now referring to FIGS. 3, 4 and 5, the planetarium projector 30 comprises a star globe 38, having pin holes therein for projecting stars upon the sky doom 34 (FIGS. 1 and 2). The star globe 38 is mounted for rotation about a fixed diurnal axle 40 (FIG. 6). Axle 40 is mounted on and may be rotated with a latitude axle 42 (FIG. 4) by means of latitude motor 44. Latitude axle 42 and latitude motor 44 are mounted to a frame 46 which may be fixably mounted to cabinet 32, as shown in FIGS. 3 and 4, or may be rotated on a turntable set on cabinet 32 for rotation about a third axis.

Lamp 48 provides soft skyglow or daylight illumination and is mounted to frame 46. Ultraviolet lamp 50 provides illumination for the fluorescent hour circles 52 and parallels of declination 54 of the invention painted on the inside of sky dome 34 (see FIGS. 1 and 2). Conventional sun and moon and planet projectors 56 may be mounted on axle 40 for rotation with the star globe 38. Preferably, however, sun and moon projectors 60—60 are mounted towards the top or north pole of the star globe 38, as are great circle projectors 62 and 64. A plurality of star pointers, according to the invention, are generally indicated at 58. These are also mounted to the earth axle 40 for rotation with the star globe 38. The star globe 38 and associated projectors may be rotated about diurnal axle 40 by means of diurnal motor 43. A cloud projector 66 is mounted to the frame 46.

Those skilled in the art will realize that the planetarium depicted in FIGS. 3 and 4 is manufactured by Goto Optical Manufacturing Company of Tokyo, Japan. The planetarium has been modified according to the invention by the addition of a rotatable latitude axle 42, lamps 48 and 50, automatic star pointer 58, and sun and moon projectors 60—60.

Also, mounted on the cabinet 32 are a plurality of projectors 68, preferably arranged so that when all of them are on, a continuous image may be projected around the horizon of the sky dome 34. Within the cabinet 32 are a vertically-mounted loudspeaker 70, automatic slide projector 72, tape recorders 74—74, audio elements 76, stepping switch programmer 78, control elements 80, and power supply 82.

Now refering to FIG. 12, the automatic star pointer 58 of the invention comprises a plurality of individual star pointers, generally indicated at 84. These each comprise a lamp 86, condenser lens 88, transparency 90, projection lens 92, and mirror 94 for projecting the circular image 96 of transparency 90 (FIG. 13) upon the sky dome.

The mirrors 94 may be set to project the image 96 at any point on the dome by rotating frame 98 and then setting set screw 100 and rotating mirror mount 102 and then setting set screw 104.

The cloud projector 66, according to the invention, is best shown in FIG. 15. It comprises an illuminating lamp 106, mounted within a generally opaque, cylindrical housing 108. Portions 110 of the housing 108 are translucent, and of varying thickness and excellently simulate the appearance of clouds on the sky dome 34.

Now referring to FIG. 21, the system of the present invention can be considered to comprise a plurality of function generators; for example: loud speaker 70; automatic slide projector 72; and on-off projectors 68 and 112 (for example, the lamp within the globe 38 of FIG. 3 for projecting the star images, the sun and moon projectors 60—60, milky way projector 114, great circle projectors 62 and 64, and planet projectors 56). The function generators further comprise: ultraviolet lamp 50; sky glow lamp 48, and fade projectors 118, (that is, those which preferably provide a controllable change in intensity of illumination; for example, cloud projector 66, individual ones of the projectors 68, and the sunrise-sunset projector 116, best shown in FIGS. 14 through 17). Other function generators include the latitude, diurnal, and third axis motors 44, 43, and 120, respectively, and the dome motor 36. The function generators preferably further comprise the automatic star pointer 58.

The planetarium is preferably under control of the two tape recorders 74a and 74b. These may be conventional tape recorders, providing audio outputs 122a and 122b which are fed to mixer amplifier 76 and thence to speaker 70. The tape recorders also provide timed signals on control lines 124a and 124b which are fed to a stepping switch 126 in the stepping switch and patch section 78 of the invention. The timed signals are recorded on the tape, either in a separate channel, that is, with a separate recording head, or as supersonic or subsonic signals recorded on the tape in a manner that is conventional.

Upon receipt of each of the timed signals on line 124 stepping switch 126 grounds a succeeding output line 128, thus energizing a separate circuit. Each of the output lines 128 is connected to one terminal on the left terminal boards or strips 130a and 130b of a patch board, generally indicated at 132. For each planetarium program, the terminals of terminal strips 130a and 130b are individually connected to preselected terminals of terminal strips 134a and 134b, respectively, be means of patch conductors 136. Each function generator control conductor 138 is connected to a different terminal on each terminal strip 134a and 134b. Thus, as each terminal of terminal strips 130a and 130b is energized, the function generator connected thereto by means of patch conductors 136 is energized. The patch conductors 136 between terminal strips 130a and 134a conducting during the program recorded on tape recorder 74a and the patch conductors 136 connecting terminal strips 130b and 134b conducting the program recorded on tape recorder 74b.

It will be obvious to those having ordinary skill in the art that various electrical means may be employed to insure that when the system is first turned on, tape recorder 74a is energized by means of control line 138a and that tape recorder 74b is energized at the termination of the program on tape recorder 74a by energization of control line 138b.

Patch connections 136 are preferably made, according to the invention automatically. For example, as shown in FIG. 24, terminal board 130a and 134a are the female elements 139 of multiconductor connector 140. The male element 142 thereof plugs into the female element 139. Patch connections 136 are permanently effected between the terminals of a portion 144a that plugs into terminal board 130a and a portion 146a that plugs into terminal board 134a. A similar connector (not shown) is provided for patching between terminal board 130b and 134b. Other means of automatic patching may be used, such as card controlled switches.

The sunrise-sunset fade projector circuit, shown in FIG. 26, comprises sunrise-sunset lamps 117 connected in circuit with an electrical energy source at terminals 148—148 under control of the rheostat 150. The rheostat slider 152 is controlled by a reversible synchronous motor 154. Reversible, synchronous motor 154 may be energized in the clockwise direction at terminal 156 or in the clockwise direction at terminal 158; terminal 160 being a common terminal. When energized, reversible, synchronous motor 154 will continue to rotate until it causes one of a pair of limit switches 162—162 to open the energization circuit thereto.

The circuit of the automatic star pointer 58 is shown in FIG. 28. It comprises star pointed lamps 86 all connected to a common energizaotion bus 164 and each connected to an individual terminal of one-half of a female programmer receptacle 166. The other terminals of programmer receptacle 166 are connected to the stepping switch 168. The common terminal 171 of commutator 168 is driven by means of stepper 170. Stepper 170 is preferably driven for a predetermined time upon energization of synchronous motor 172, which effects such energization by means of a rotary cam 174 operating switch 176. The automatic star pointer may be pre-programmed by plugging pre-connected programmer board 178 into the programmer receptacle 166. Boards 166 and 178 may be a multiconductor connector. Other means such as punched card controlled switches may be used to program the star pointer.

SPECIFIC DESCRIPTION

More particularly, referring to FIGS. 1 and 2, the planetarium 30 and control cabinet 32 may be conveniently mounted on rollers (not shown) so that they may be stored in a closet or to the side of the lecture room. The sky dome 34 is preferably suspended on a cable 35 passing over pulleys 37 and thence to control motor 36. In this way, the sky dome 34 may be raised and lowered so that the lecture room may be used for other purposes.

The sky dome 34 is of conventional construction. It has a plurality of vertical ribs 31 and horizontal ribs 33 over which a thin fabric 39 is stretched. Such domes are in wide use today in Japan. The inside of the sky dome 34 is preferably white and a good reflecting surface. The hour circles 52 and parallels of declination 54 may conveniently correspond with the vertical and horizontal ribs 31 and 33 respectively. As has previously been stated, the hour circles and parallels of declination 52 and 54 are formed of luminous paint or the like that fluoresces under ultraviolet radiation. The meridian may be similarly delineated on dome 34.

As previously stated and as best seen in FIG. 4, the star globe 38 and automatic star pointer 58 are supported on latitude axle 42. Additional rigidity is provided by U-shaped frame 180, also supported on latitude axle 42. Now referring to FIG. 6, diurnal axle 40 is threaded into the bottom of U-shaped support member 180. Counterweight 182 is also affixed thereto and does not rotate with respect to member 180. Housing 184 is affixed to latitude axle 42 and does not rotate with respect thereto. Star globe 38 and support elements 186 are threaded to a hollow shaft 188. These are supported for rotation with respect to housing 184 by ball bearing 190. A large diameter ring gear 192 is mounted to a slip ring support 193 which in turn is mounted to hollow shaft 188. Ring gear 192 is driven by drive gear 194 mounted on the shaft of diurnal axis motor 43. Motor 43 is supported in housing 184.

A cable (not shown) passing through latitude axle 42 connects to the wipers of commutator 196. The slip rings thereof are mounted on commutator support 193. The slip rings are connected to the planet projectors, generally indicated at 56 by wiring (not shown).

Star pointer support 198 is mounted to hollow shaft 188 and rotates therewith. Power is supplied to the star pointer through commutator 200 by means of a cable 202 threaded through support 180 and connected to stationary wipers 203. The connections between the slip rings of commutator 200 and the automatic star pointer 58 are not shown. The star pointer programmer receptacle 166 and programmer board 178 (FIG. 28) are mounted in housing 204 mounted to star pointer support 198. Commutator 168 is also mounted thereto.

Cable 205 passes through hollow shaft 40 and supplies power via wires 206—206 to the occulting unit generally indicated at 208. Cable 205 is also connected to the wipers of slip ring unit 210. The slip rings thereof are connected to the sun and moon projector 60—60, great circle projectors 62 and 64, and milky way projector 114, (FIG. 3), via cable 212.

The indavadual planet projectors 56 are constructed in the same manner as the individual automatic star pointers 84.

The details of the mountings 214 of planet projector 56 are shown in FIGS. 10 and 11. As best seen in FIG. 14, the ultraviolet and sky glow lamps 48 and 50 are shielded from the spectators' view by means of shades 216. More than one such lamp may be provided for each of these functions for greater and more uniform illumination of the sky dome 34.

The sunrise-sunset projector 116 (FIGS. 14, 15 and 17) comprises a cylindrical housing 218 enclosing a lamp 117. Housing 218 has a shaped opening 220 therein covered by a transparency 222 appropriately shaded to provide the appearance of sunrise or sunset on the sky dome 34. Each special effects projector 68 comprises, as shown in detail in FIG. 18, a lamp 224; condenser lens 226; transparency support 228; when in use, a transparency 230; and projecting lens assembly 232.

It will be obvious to those familiar with planetariums that many modifications can be made in the above-described apparatus for varying or improving the quality of the planetarium displays and for producing special effects. Furthermore, the various function generators may be mounted in various ways to the planetarium proper and the wiring may be effected through any convenient means without departing from the scope of the present invention.

Now referring to FIG. 21, from the preceding description, it will be apparent that a planetarium lecture may be set up by placing a recorded tape 234a on tape reproducer 74a and effecting patch connections 136 between terminal strips 130a and 134a by means of a pre-programmed plug 142 (FIG. 24). While tape 234a is playing, the lecture and sound effects recorded thereon will be reproduced by speaker 70. At timed intervals, stepping signals will be provided on line 124a to stepping switch 126. Each signal will cause the successive grounding of one of the lines 128. The upper half of the lines 128 are each connected to one terminal strip 130a and thus upon the grounding of each, those function generators are energized that are connected thereto by means of patch connections 136.

At the end of the lecture on tape 234a, the final timed signal on conductor 124 causes stepping switch 126 to ground the first terminal on terminal strip 130b. This will energize tape recorder 174b which is connected to the second from the top terminal on terminal strip 134b. A second lecture will then be played on tape deck 174b as recorded on tape 234b. During this lecture, the second half of the conductors 128 are successively grounded to initiate the functions connected to each of the terminals on terminal strip 130b. These connections are effected by a second programming plug 142 (FIG. 24) connecting terminal strips 130b and 134b.

In the embodiment of the invention shown, the automatic star pointer is only utilized during the second lecture recorded on tape 234b and a single programming plug 178 (FIG. 28) is utilized. In other embodiments of the invention, one-half of the outer contacts of commutator 168 may be utilized for the first program, its connections being effected by a first plug 178, and the second half utilized for the second program, its connections being effected by a second plug 178 in a manner similar to the two program connections effected at master patch board 132, (FIG. 21).

Now referring to FIG. 22, the power supply of the invention comprises a fuse block 236, D.C. power supply 238, six volt transformer 240, and four volt transformer 242. Common A.C. supply line 244 supplies power to a plurality latching relays 246 and standard relays 248. The control terminals 250 of these relays 246 and 248 are each connected to one terminal on each of terminal strips 134a and 134b.

For example, latching relay LR-1 may control illumination of the sun and moon lamps (FIG. 29). Latching relay LR-2 may control the lamp in the automatic slide projector; latching relay LR-3 may actuate any other effect which it is desired to have continued while other functions are performed. Relay RY-1 operates the main slide mechanism in the automatic slide projector, and relays RY-2 and RY-3 may operate other function generators consuming large amounts of power.

Now referring to FIG. 23, tape decks 74a and 74b are connected to common A.C. supply line 244 and are grounded via lines 138a and 138b, respectively. Lines 138a and 138b are permanently connected to the uppermost and second uppermost terminals of terminal strips 134a and 134b respectively, (FIG. 21). The uppermost output line 128a from stepping switch 126 is preferably initially grounded when the planetarium system is turned on to begin playing the lecture recorded on tape 234a. When the last output line 128b assigned to tape deck 74a is grounded, line 138b (patch connected to line 128b) is grounded to start tape deck 74b. The timed pulses are provided as a switch closing across lines 124a or 124b to control the stepping switch 126 (FIG. 21). As previously explained, the audio outputs 122a and 124b of the two-tape decks 74a and 74b are connected to mixer amplifier 76 and thus supply to speaker 70.

Now referring to FIG. 25, the automatic slide projector 72 is conventional. For example, it may be the "Carousel" type manufactured by Eastman Kodak Company of Rochester, N.Y. The slides for the two programs are loaded in sequence in the slide holder 252. The fan and light of the projector 72 are energized by shorting terminals 254. The slide-changing mechanism is actuated by shorting terminals 256. A manual-automatic control supplied by the manufacturer 258 may also be provided for versatility. Terminals 254 are connected to latching relay LR-2. Initial grounding of input terminal 250 of latching relay LR-2 causes its output terminals connected to terminals 254 to be shorted and they remain shorted until a second grounding of input terminal 250 of latching relay LR-2. Terminals 256 are shorted only during receipt of a ground pulse at input terminal 250 of relay RY-1.

The operation of the fade control on the sunrise-sunset lamps of FIG. 26 has been previously explained. It will be understood that other fade projectors in planetarium installation will be under similar control.

Now referring to FIG. 27, latitude motor 44 can be driven in either of two directions by grounding terminal 258 or 260, terminal 262 being connected to A.C. common line 244 of FIG. 22, as is terminal 160 of the sunrise-sunset lamps of FIG. 26. The motion of the latitude axis 42 is limited by limit switches 264—264 in the same way that the motion of fade motor 154 (FIG. 26) is limited by limit switches 162—162. The diurnal and third axis motors 43 and 120 (FIG. 21) are controlled by similar circuits.

Now referring to FIG. 28, whenever a ground is supplied to terminal 266, synchronous motor 172 is energized as the other terminal 268 thereof is connected to the A.C. common line 244 (FIG. 22). After a predetermined time delay, switch 176 is closed by cam 174. This energizes stepper 170 through base slip ring assembly 200. This causes wiper 171 to advance one contact to energize the star pointer connected to the first terminal 270 of female terminal board 166. Each time the cam 164 opertaes switch 176, rotary stepper 170 will advance wiper 171 to the next contact. Discontinuing the ground at terminal 266 controlling synchronous motor 172 will discontinue advance of the stepper of 168. Thus, it can be arranged to have the automatic star pointer at a star for a long length of time while other program functions are initiated and terminated and the pointer function may be interspersed throughout a prerecorded lecture.

Now referring to FIG. 29, a meridian lamp 272 (not sown in FIGS. 1 through 20) may be mounted as convenient on the planetarium. So as not to be too bright, it is energized with four volts A.C. at terminal 274; terminal 276 being connected to one terminal on each of terminal boards 134a and 134b (FIG. 21). The star lamp 278, (see also FIG. 6), and the milky way lamp 280 are illuminated simultaneously and are in the nature of on-off projectors; one terminal of the star lamp 278 is connected through resistor 282, through occulting unit 208 to four volt A.C. terminal 274. The other terminal of star lamp 278 is connected through occulting unit 208 to the wiper 284 of potentiometer 286. Similarly, one terminal of the milky way lamp 280 is connected through a resistor 288 and commutator 210 to terminal 274. The other terminal thereof is connected through commutator 210 to wiper 284. Potentiometer 286 is connected across the four-volt transformer 242 of FIG. 22. Wiper 284 is driven by a synchronous motor 290 under control of limit switches 292—292 in a manner similar to that of the fade projector, FIG. 26. Illumination is increased by supplying ground to terminal 294 and decreased by supplying ground to terminal 296. These terminals are, of course, connected to individual terminals on terminal strips 134a and 134b (FIG. 21).

The sun and moon lamps 298 are connected through commutator 210 of the six volt transformer 240 of FIG. 22. They are controlled by the supply of ground to terminal 300 connected to one terminal on each of terminal boards 134a and 134b. The equator and ecliptic lamps 302 are connected through commutator 210 to four volt terminal 274 and are energized by supplying ground to terminal 304 connected to an individual terminal on each of terminal boards 134a and 134b.

The planet lamps generally indicated at 306 in FIG. 30 are also energized through commutator 210. They are connected at one terminal to the six volt transformer 240 of FIG. 22 and at another terminal 308 to a terminal on each of terminal boards 134a and 134b of FIG. 21.

It will thus be seen that the objects set forth above are among those apparent from the preceding description, are efficiently attained, and since certain changes may be made in the above-described constructions and systems without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. In a planetarium of the type having a projector,
 a star globe having pinholes therein for projecting stars on a sky dome, said star globe being mounted for rotation about a first axis:
 means to rotate said globe about a second axis perpendicular to said first axis, comprising a rotatable latitude axle supporting said star globe and,
 a plurality of star pointer projectors mounted for simultaneous rotation with said star globe, means to automatically program said star pointer projectors and the rotation of said globe about said two axes, said star pointer projectors comprising a plurality of individual star pointers, each including light means for projecting a target image adjacent to a star being pointed out and each being adjustable to point to a specific star during a planetarium program, said program means including stepping means for energizing the light means of each of said star pointers in a predetermined order.

2. The pre-programmed planetarium defined in claim 1 and pre-programmable patching means interposed between said stepping means and said individual star pointers.

3. The pre-programmed planetarium of claim 2 wherein said pre-programmable patching means is programmed by means of pre-connected electrical circuit means.

4. The pre-programmed planetarium of claim 1 wherein each said star pointer projector projects a circle about a star being pointed out.

5. The pre-programmed planetarium of claim 1 wherein said means to program comprises record reproducing means for reproducing a program record comprising a sound track coordinated with said switching signals.

6. The pre-programmed planetarium defined in claim 5 wherein said record reproducing means is adapted to reproduce in sequence two of said program records.

7. The pre-programmed planetarium defined in claim 2 wherein said electrical patching means is adapted to effect said connections by means of pre-wired circuit means, connectable thereto.

8. The pre-programmed planetarium defined in claim 1 having an automatic slide projector for projecting of slides.

9. Apparatus as in claim 1 having programming means comprising:
(A) pre-programmed sequencing means connected to said programming means,
(B) pre-programmed circuit connection means connected to said programming means,
(C) a plurality of slides; and,
(D) audio lecture means for use with the above, said programming means being connected to program said slides and said audio lecture means.

10. The planetarium programming means defined in claim 9 wherein said sequencing means and said lecture are recorded on a common recording medium.

References Cited

UNITED STATES PATENTS

| | | | |
|---|---|---|---|
| 2,632,359 | 3/1953 | Spitz | 35—42.5 |
| 2,848,922 | 8/1958 | Field | 353—42 |
| 2,964,743 | 12/1960 | Bange | 90—13.99X |
| 2,985,069 | 5/1961 | Sampson | 35—35(.3)UX |
| 3,220,305 | 11/1965 | Gelder et al. | 353—42 |
| 3,269,033 | 8/1966 | Redfield et al. | 25—35(.3) |
| 3,303,582 | 2/1967 | Farquhar | 35—47 |
| 3,461,457 | 8/1969 | Kawamura et al. | 179—100.2(S) |

FOREIGN PATENTS

| | | | |
|---|---|---|---|
| 1,183,002 | 1/1959 | France | 179—100.2(S) |

JEROME SCHNALL, Primary Examiner

U.S. Cl. X.R.

40—28.1; 179—100.2; 340—339; 353—11, 42